(12) United States Patent
Kaufmann et al.

(10) Patent No.: US 11,731,756 B2
(45) Date of Patent: Aug. 22, 2023

(54) CONTROL SYSTEM FOR AN AIRCRAFT

(71) Applicants: Airbus Operations GmbH, Hamburg (DE); Airbus Operations (S.A.S.), Toulouse (FR)

(72) Inventors: Alena Kaufmann, Bremen (DE); Jérôme Robillard, L'Isle Jourdain (FR)

(73) Assignees: AIRBUS OPERATIONS GMBH, Hamburg (DE); AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 17/731,735

(22) Filed: Apr. 28, 2022

(65) Prior Publication Data

US 2022/0348313 A1    Nov. 3, 2022

(30) Foreign Application Priority Data

Apr. 30, 2021    (EP) .................................... 21171623

(51) Int. Cl.
*B64C 13/36* (2006.01)
*B64C 9/08* (2006.01)

(52) U.S. Cl.
CPC ................ *B64C 13/36* (2013.01); *B64C 9/08* (2013.01)

(58) Field of Classification Search
CPC ......... B64C 9/08; B64C 13/36; F15B 11/162; F15B 13/022
See application file for complete search history.

(56) References Cited

U.S. PATENT DOCUMENTS

| 4,428,196 A * | 1/1984 | Boehringer ............ B64D 41/00 60/420 |
| 9,103,338 B2 * | 8/2015 | Fukui ..................... F15B 20/004 |
| 2014/0312170 A1* | 10/2014 | Hara ....................... B64C 13/42 244/99.5 |

FOREIGN PATENT DOCUMENTS

| CN | 109 850 133 A | 6/2019 |
| EP | 2 457 825 A2 | 5/2012 |
| EP | 3 273 593 A1 | 1/2018 |

OTHER PUBLICATIONS

European Search Report for Application No. 21171623 dated Oct. 7, 2021.

* cited by examiner

*Primary Examiner* — Richard G Davis
(74) *Attorney, Agent, or Firm* — KDW Firm PLLC

(57) ABSTRACT

A control system for an aircraft includes a hydraulic pump, first hydraulic line, second hydraulic line, a first actuator coupled with a first control surface, a second actuator coupled with a second control surface, and a third actuator coupled with a third control surface. The first control surface and the second control surface are at a distance to each other and symmetrically relative to a symmetry axis. The third control surface is substantially on the symmetry axis, and the first hydraulic line and the second hydraulic line are connected to the hydraulic pump. The first actuator is connected to the first hydraulic line, and the second actuator is connected to the second hydraulic line. The third actuator is connected to the first hydraulic line downstream of the first actuator at a junction point, and the first hydraulic line at least partially includes a larger diameter than the second hydraulic line.

15 Claims, 1 Drawing Sheet

CONTROL SYSTEM FOR AN AIRCRAFT

CROSS-REFERENCE TO RELATED APPLICATION

This application claims priority to European Patent Application No. 21171623.8 filed Apr. 30, 2021, the entire disclosure of which is incorporated by reference herein.

TECHNICAL FIELD

The disclosure herein relates to a control system for an aircraft and to an aircraft having such a control system.

BACKGROUND

In conventional commercial aircraft usually two elevators and a rudder are connected to the same hydraulic line. During flight there are different flow demands coming from both elevators and the rudder at the same time. The conventional hydraulic architecture is designed to achieve a symmetric supply of pressure and flow for the two elevators, while they are both exposed to the flow and pressure demands of the rudder in the same way. A different power supply at the elevator may cause different behavior of right hand and left hand elevator. In a conventional hydraulic architecture there may be used a rather long hydraulic line that extends from the center of the aircraft to a tail region. A high effort in routing is conducted for providing a suitable segregation, which may lead to more and longer hydraulic lines to be installed in the aircraft.

SUMMARY

An object of the disclosure herein is to provide a particularly simple hydraulic or control system that reduces pipework to be followed for routing of hydraulic lines.

This object is met by a control system with features disclosed herein. Advantageous embodiments and further developments are derivable from the following description.

A control system for an aircraft is proposed, comprising a hydraulic pump, a first hydraulic line, a second hydraulic line, at least one first actuator coupled with a first control surface, at least one second actuator coupled with a second control surface, and at least one third actuator coupled with a third control surface, wherein the first control surface and the second control surface are arranged at a distance to each other and symmetrically relative to a symmetry axis, wherein the third control surface is arranged substantially on the symmetry axis, wherein the first hydraulic line and the second hydraulic line are connected to the hydraulic pump, wherein the at least one first actuator is connected to the first hydraulic line, wherein the at least one second actuator is connected to the second hydraulic line, wherein the at least one third actuator is connected to the first hydraulic line downstream of the at least one first actuator at a junction point, and wherein the first hydraulic line at least partially comprises a larger diameter than the second hydraulic line.

The hydraulic pump may be realized in a form of a variable or constant displacement pump. While it may be possible to drive the hydraulic pump through an engine installed in the aircraft, it may be particularly advantageous to couple the hydraulic pump with an electric motor. The electric motor and/or the hydraulic pump may be controlled through a control unit to provide a variable pressure and/or a variable flow rate.

Both the first hydraulic line and the second hydraulic line are connected to the hydraulic pump and extend in the direction of the actuators. While it is referred to hydraulic lines in the singular form, it is clear that the hydraulic lines include supply and return lines. Furthermore, a reservoir, filters, check valves and other features may be present as in common hydraulic systems.

The actuators may be identical or may differ from each other, depending on the expected loads, desired speeds, and the number of first, second or third actuators that act on one of the control surfaces together. The at least one third actuator is connected to the first hydraulic line downstream of the at least one first actuator. This means that the at least one third actuator receives pressurized hydraulics fluid that has passed the junction point, at which the at least one first actuator has been supplied with the hydraulic fluid. As the first hydraulics line may at least temporarily supply a larger flow rate to the connected actuators than the second hydraulics line, it comprises a larger diameter for at least partially compensating the resulting higher flow resistance.

A gist of the disclosure herein lies in supplying the at least one first actuator and the at least one third actuator with hydraulic fluid from that first hydraulic line, while the second hydraulic line exclusively supplies hydraulic fluid to the at least one second actuator. In doing so, a clearly asymmetric setup is created, while the arrangement of the first control surface and the second control surface is substantially symmetric relative to the symmetry axis. In this regard, the symmetry axis may particularly be a longitudinal axis of the respective aircraft or a line parallel thereto. Hence, the distance between the first control surface and the symmetry axis as well as between the second control surface and the symmetry axis are substantially identical.

The advantage of such an asymmetric routing is a reduction of pipework and thus a reduction of weight, installation effort and pressure drop within the pipes.

A first hydraulic path length from the hydraulic pump to the at least one first actuator may differ from a second hydraulic path length from the hydraulic pump to the at least one second actuator by 20% as a maximum. Thus, the first and second hydraulic path lengths are substantially the same. However, due to different connection arrangements between the junction point and the at least one first actuator as well as along the second hydraulic line, minor differences in the path lengths may be expected and tolerated. Thus, the design of the hydraulic paths between the junction point and the at least one first actuator as well as the second hydraulic path may substantially be the same.

A third hydraulic path length from the junction point to the at least one third actuator may differ from the first path length and the second path length by 20% as a maximum. In analogy to the first and second hydraulic path lengths it is advantageous, if the third hydraulic path length roughly equals the first path length and/or the second path length.

The first hydraulic line and the second hydraulic line may be connected to different ports of the hydraulic pump. This is advantageous to prevent a complete loss of hydraulic actuators of the aircraft in a failure case. For example, if one of the hydraulic lines is clogged or ruptured, at least one of the first, second and third actuators is still operable.

The at least one first actuator may be connected to the junction port through a first branch line, wherein the first hydraulic line comprises a larger diameter than the first branch line. The first hydraulic line supplies a flow rate that is required for operating the at least one first actuator and the at least one third actuator. Thus, the maximum flow rate in the first branch line is clearly lower than the maximum flow rate in the first hydraulic line. Thus, it is advantageous to dimension the first hydraulic line to comprise a larger diameter than the first branch line.

The at least one third actuator may be connected to the first hydraulic line through a second branch line, wherein the diameter of the first hydraulic line exceeds a diameter of the second branch line. In analogy to the first branch line, it is advantageous to also reduce the diameter of the second branch line in comparison to the first hydraulic line.

The diameter of the second branch line may exceed the diameter of the first branch line. This may be particularly advantageous if the at least one third actuator is larger than the at least one first actuator. Thus, a very low flow resistance can be achieved.

The diameter of the first branch line and of the second hydraulic line may be substantially equal. Since the at least one first actuator and the at least one second actuator are symmetrically arranged and may comprise very similar hydraulic path lengths, it is advantageous to provide substantially equal diameters.

The first branch line may be arranged substantially transverse to the first hydraulic line. Thus, the first branch line branches off the junction point substantially transverse to the first hydraulic line. It is particularly advantageous, if the first hydraulic line and the second hydraulic line are at least partially arranged parallelly to the symmetry axis. This is particularly useful, if the first control surface and the second control surface are elevators that are clearly arranged at a distance to the longitudinal axis of the respective aircraft, while the third control surface may be a rudder with at least one third actuator positioned at a further distance to the hydraulic pump.

The first branch line and the second hydraulic line may be arranged in a substantially mirror inverted manner. Consequently, the path from the hydraulic pump to the respective first and second actuator may be designed substantially similar.

The disclosure herein further relates to an aircraft, comprising at least one control system according to the above.

The at least one control system may be arranged behind a pressure bulkhead of the aircraft. The pressure bulkhead may relate to a rear pressure bulkhead, which is arranged in a tail region of an aircraft fuselage and separates a pressurized cabin region from an unpressurized fuselage region. The first, second and third control surfaces may be arranged behind the pressure bulkhead, for example in a tail plane.

The first control surface and the second control surface may be elevators. In particular, the first control surface may be a left hand elevator, and the second control surface may be a right hand elevator. The at least one first actuator and the at least one second actuator may be placed in a horizontal tail plane forward of the elevators.

The third control surface may be a rudder. The at least one third actuator may be placed in a vertical tail plane at a vertical distance to the horizontal tail plane.

BRIEF DESCRIPTION OF THE DRAWINGS

Further features, advantages and possible applications of the disclosure herein will be apparent from the following description of the embodiments and the figures. In this context, all the features described and/or illustrated constitute the subject-matter of the disclosure herein on their own and in any combination, also irrespective of their composition in the individual claims or their references. Furthermore, in the figures the same reference numerals stand for the same or similar objects.

DETAILED DESCRIPTION

Figure 1:
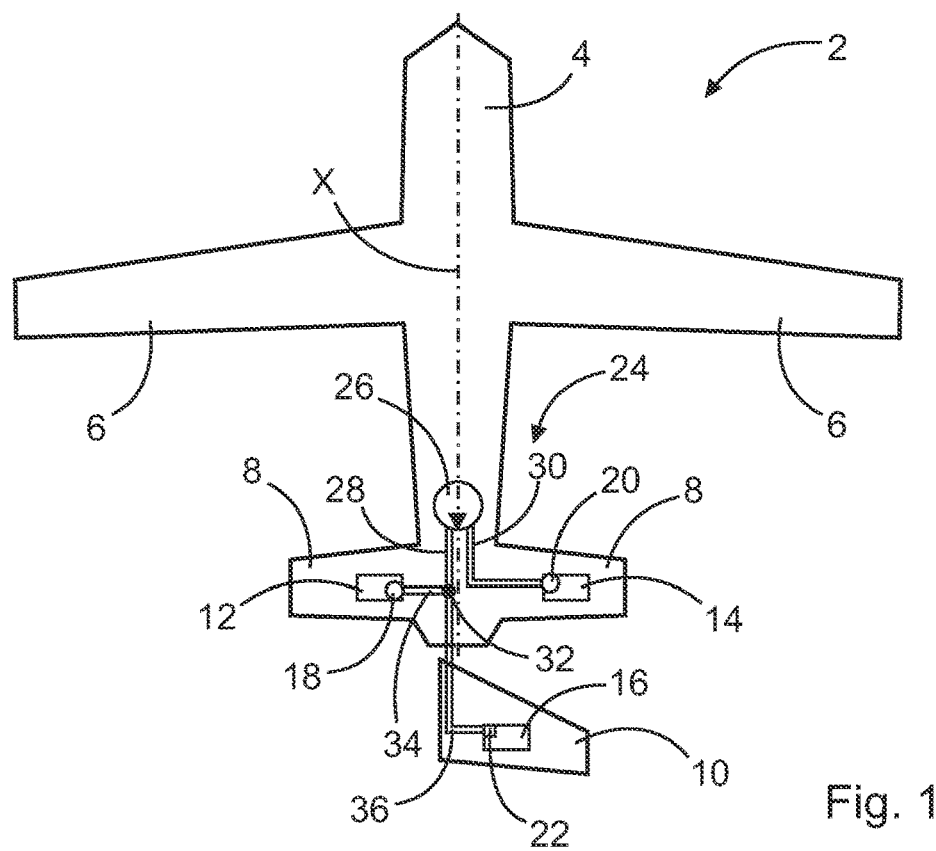
FIG. 1 shows an aircraft having a control system in a schematic plan view.

FIG. 1 shows an aircraft 2 having a fuselage 4, to wing halves 6, horizontal tail planes 8 and a vertical tail plane 10. The latter is shown schematically, and it should be clear that the vertical tail plane 10 is arranged perpendicular to the horizontal tail plane 8. The aircraft 2 comprises a longitudinal axis x, which also defines a symmetry line for the wing halves 6, the horizontal tail planes 8 and the vertical tail pane 10.

Horizontal tail planes 8 comprise a first control surface 12 in the form of a left-hand elevator and a second control surface 14 in the form of a right hand elevator. The vertical tail plane 10 comprises a third control surface 16 in the form of a rudder. Exemplarily, the elevators 12 and 14 as well as the rudder 16 are coupled with a first actuator 18, a second actuator 20 and a third actuator 22, respectively.

The aircraft 2 comprises a control system 24, to which the actuators 18 to 22 belong. The control system 24 furthermore comprises a hydraulic pump 26, a first hydraulic line 28 and a second hydraulic line 30. The first and the second hydraulic lines 28 and 30 are both coupled with the hydraulic pump 26, but at different ports. The first hydraulic line 28 comprises a junction point 32, to which a first branch line 34 is connected, leading to the first actuator 18. A second branch line 36 leads to the third actuator 22. The second hydraulic line 30 is connected to the second actuator 20.

Hence, the control system 24 comprises an asymmetric setup, as the first hydraulic line 28 supplies both the first hydraulic actuator 18 and the third hydraulic actuator 22 with hydraulics fluid.

Figure 2:
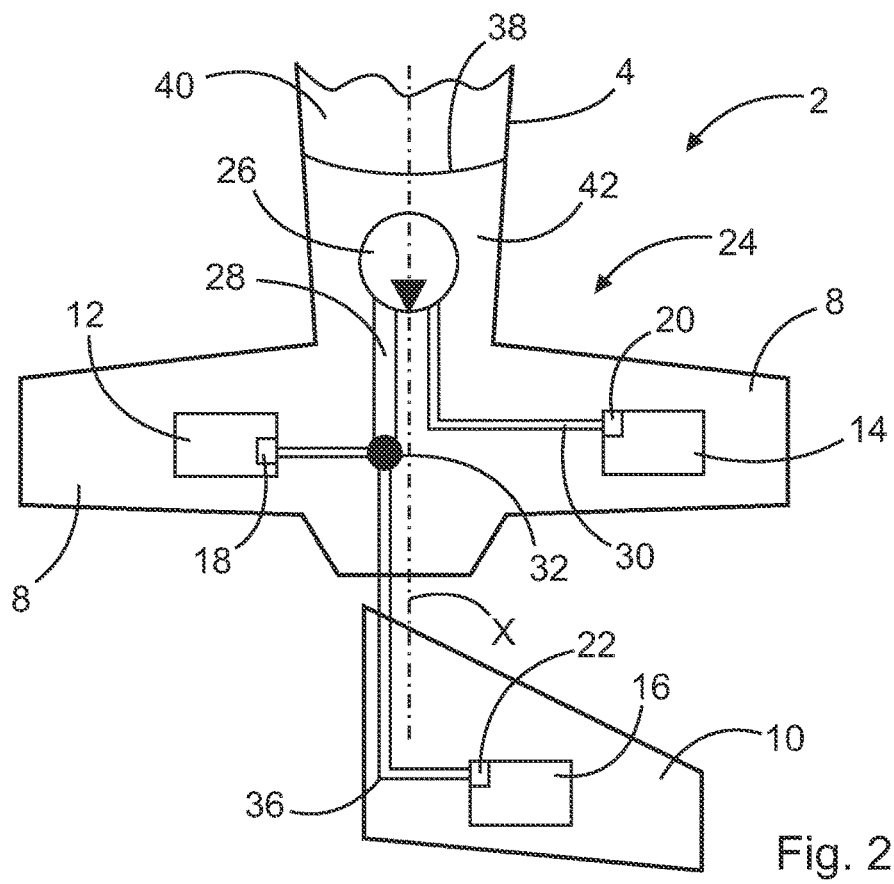
FIG. 2 shows a detail of the aircraft and the control system.

In FIG. 2 an enlarged view shows the control system 24 in more detail. Here, the first hydraulic line 28 comprises the largest diameter, while the first branch line 34 and the second hydraulic line 30 comprise the smallest diameter. The diameter of the second branch line 36 has an intermediate diameter that exceeds the diameter of the first branch line 34 and the second hydraulic line 30 and is smaller than the diameter of the first hydraulic line 28. Thus, the different flow demands in terms of pipe dimensions are respected.

As apparent from FIG. 2, a pressure bulkhead 38 is arranged in the fuselage 4 and separates a pressurized cabin region 40 from an unpressurized fuselage region 42. The control system 24 is arranged behind the pressure bulkhead 38, such that it is arranged in the unpressurized fuselage region 42. A segregation of hydraulic lines is not required and lines can be routed closer together. Other layouts of mechanical installation become possible, where e.g. hydraulic lines are routed close to the structure and thus provide enough space for APU fuel and bleed lines/other mechanical and electrical systems and other installations.

In addition, it should be noted that "comprising" does not exclude other elements or steps, and "a" or "an" does not exclude a plurality. Further, it should be noted that features that have been described with reference to any of the above embodiments may also be used in combination with other features of other embodiments described above. Reference signs in the claims are not to be regarded as a limitation.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 aircraft
4 fuselage
6 wing half
8 horizontal tail plane
10 vertical tail plane
12 first control surface/left hand elevator
14 second control surface/right hand elevator
16 third control surface/rudder
18 first actuator
20 second actuator
22 third actuator
24 control system
26 hydraulic pump
28 first hydraulic line
30 second hydraulic line
32 junction point
34 first branch line
36 second branch line
38 pressure bulkhead
x longitudinal axis/symmetry axis

The invention claimed is:

1. A control system for an aircraft, comprising:
   a hydraulic pump;
   a first hydraulic line;
   a second hydraulic line;
   at least one first actuator coupled with a first control surface;
   at least one second actuator coupled with a second control surface; and
   at least one third actuator coupled with a third control surface;
   wherein the first control surface and the second control surface are arranged at a distance to each other and symmetrically relative to a symmetry axis,
   wherein the third control surface is arranged substantially on the symmetry axis,
   wherein the first hydraulic line and the second hydraulic line are connected to the hydraulic pump,
   wherein the at least one first actuator is connected to the first hydraulic line,
   wherein the at least one second actuator is connected to the second hydraulic line,
   wherein the at least one third actuator is connected to the first hydraulic line downstream of the at least one first actuator at a junction point, and
   wherein the first hydraulic line at least partially comprises a larger diameter than a diameter of the second hydraulic line.

2. The control system according to claim 1, wherein a first hydraulic path length from the hydraulic pump to the at least one first actuator differs from a second hydraulic path length from the hydraulic pump to the at least one second actuator by 20% as a maximum.

3. The control system according to claim 2, wherein a third hydraulic path length from the junction point to the at least one third actuator differs from the first hydraulic path length and the second hydraulic path length by 20% as a maximum.

4. The control system according to claim 1, wherein the first hydraulic line and the second hydraulic line are connected to different ports of the hydraulic pump.

5. The control system according to claim 1, wherein the at least one first actuator is connected to the junction port through a first branch line, and
   wherein the first hydraulic line comprises a larger diameter than a diameter of the first branch line.

6. The control system according to claim 5, wherein the at least one third actuator is connected to the first hydraulic line through a second branch line, and
   wherein the diameter of the first hydraulic line exceeds a diameter of the second branch line.

7. The control system according to claim 6, wherein the diameter of the second branch line exceeds the diameter of the first branch line.

8. The control system according to claim 6, wherein the diameter of the first branch line and of the second hydraulic line are substantially equal.

9. The control system according to claim 5, wherein the first branch line is arranged substantially transverse to the first hydraulic line.

10. The control system according to claim 5, wherein the first branch line and the second hydraulic line are arranged in a substantially mirror inverted manner.

11. An aircraft comprising at least one control system according to claim 1.

12. The aircraft according to claim 11, wherein the at least one control system is arranged behind a pressure bulkhead of the aircraft.

13. The aircraft according to claim 11, wherein the first control surface and the second control surface are elevators.

14. The aircraft according to claim 13, wherein the first control surface is a left hand elevator, and
    wherein the second control surface is a right hand elevator.

15. The aircraft according to claim 11, wherein the third control surface is a rudder.

* * * * *